INVENTOR
RALPH A. BENSON
BY George A. Herbster
ATTORNEY

INVENTOR
RALPH A. BENSON
BY George A. Herbster
ATTORNEY

Jan. 26, 1971 R. A. BENSON 3,559,177

VARIABLE LENGTH, DIVERSE FORMAT DIGITAL INFORMATION TRANSFER SYSTEM

Filed Sept. 3, 1968 7 Sheets-Sheet 3

REMOTE STATION-1

REMOTE STATION ADDRESS DECODER AND COMPLEMENT ENCODER

INVENTOR
RALPH A. BENSON

BY George A. Herbster
ATTORNEY

FIG. 6 REMOTE STATION SCAN CONTROL AND COMMAND DECODER-ENCODER

MASTER STATION SCAN CONTROL AND COMMAND DECODER

DISPLAY SELECTOR AND DISPLAY DECODER

INVENTOR
RALPH A. BENSON
BY George A. Hofstetter
ATTORNEY

United States Patent Office 3,559,177

Patented Jan. 26, 1971

3,559,177

VARIABLE LENGTH, DIVERSE FORMAT DIGITAL INFORMATION TRANSFER SYSTEM

Ralph A. Benson, Peabody, Mass., assignor to General Electric Company, a corporation of New York Filed Sept. 3, 1968, Ser. No. 756,846
Int. Cl. H04q 9/00
U.S. Cl. 340—163 22 Claims

ABSTRACT OF THE DISCLOSURE

A system for continuously transferring digital information formed of variable length digital messages between first and second locations. Means at the first location call for the information. Means at the second location transfer the information as a plurality of data words. At the termination of data word transmission of either all data or a specific section of data, a last-data word is generated and decoded to reset synchronized control means at each location and initiate additional information transfer.

BACKGROUND OF THE INVENTION

This invention is generally related to digital information transfer systems and more specifically to such systems adapted for transferring variable quantities of digital data.

Digital information transfer systems adapted to incorporate the invention described hereinafter may take many diverse forms. Generally data, represented as digital information at one location must be transferred to a second location. For example, in supervisory telemetering control systems digital information at a plurality of remote stations is transferred to a master station where it is recorded. This transfer occurs as the master station sequentially scans each remote station. As each remote station is scanned, it causes all data to be transferred to the master station in the form of a message.

This invention is particularly adapted for improving the efficiency of digital information transfer especially in applications where the digital information quantity varies. In supervisory systems the master station normally sequentially interrogates each remote station and then awaits the transmission of digital information from the remote station. At the remote station a plurality of digital message generators are usually programmed to respond in sequence and may also respond with different formats. Therefore, the message length from different remote stations may vary and the message from a single remote station may vary at different times.

In the following discussion message formats using three types of data are considered. A first type is "continuous data" which is continuously monitored and usually represents critical parameters. "Non-continuous data" refers to data which need only be accumulated and read out occasionally. Finally, "indication point data" refers to data indicating the status of a two-condition controllable device. Normally indication data is read only if one or more devices have changed condition.

In one specific example, a power system, a remote station could be located at a substation to read and transmit data. Continuous data could take the form of kva. output and line voltage. Non-continuous data might include power factor and kilowatt-hour readings. Indication points would represent individual circuit breaker status in the power station. Another example is a gas pipeline pumping station where the continuous data could be constituted by input and discharge pressures and gas flow rate. Gas temperature, turbine speed and accumulated flow would be representative of non-continuous data. One example of indicating point data would be a valve position. As these and other examples are considered, it will be evident that each electrical power substation, each gas pipeline pumping station or each remote station in other systems may have different numbers of readings and indication points. Therefore, if the data from each point is transmitted as a constant length word and the number of points vary, the message length from each remote station will vary.

A number of approaches have been taken in data collection systems for implementing a system which utilizes a variable length message. For example, the master station could be programmed to interrogate a remote station and then stay open for a timing period equal to the length of the longest possible message from any remote station. Such a system could be made slightly more efficient by programming the master station for the longest possible message from each remote station. Either of these approaches can result in relatively extended periods where the master station listens to an open line so that efficient utilization of the system is not obtained.

Therefore, it is the object of this invention to provide a digital information transfer system wherein the communications equipment is constantly active.

Another object of this invention is to provide a digital information transfer system which is capable of handling variable length messages.

Still another object of this invention is to provide a digital information transfer system which is capable of handling variable length messages of diverse formats.

Yet still another objective of this invention is to provide a supervisory telemetering system which is capable of transmitting messages representing diverse types of data and wherein the data from a particular station may be a variable length.

SUMMARY

In accordance with this invention a command message is sent from a master station to a remote station. The selected remote station responds by transmitting data words to the master station. When data transmission is complete the remote station generates a last-data word. This word causes the entire system to reset and causes the master station to interrogate the next remote station in sequence.

This invention has been pointed out with particularity in the appended claims. A more thorough understanding of the above and further objects and advantages of this invention may be obtained from the following detailed discussion taken in conjunction with the accompanying drawings.

DESCRIPTION OF AN ILLUSTRATIVE EMBODIMENT

Figures 1, 4:
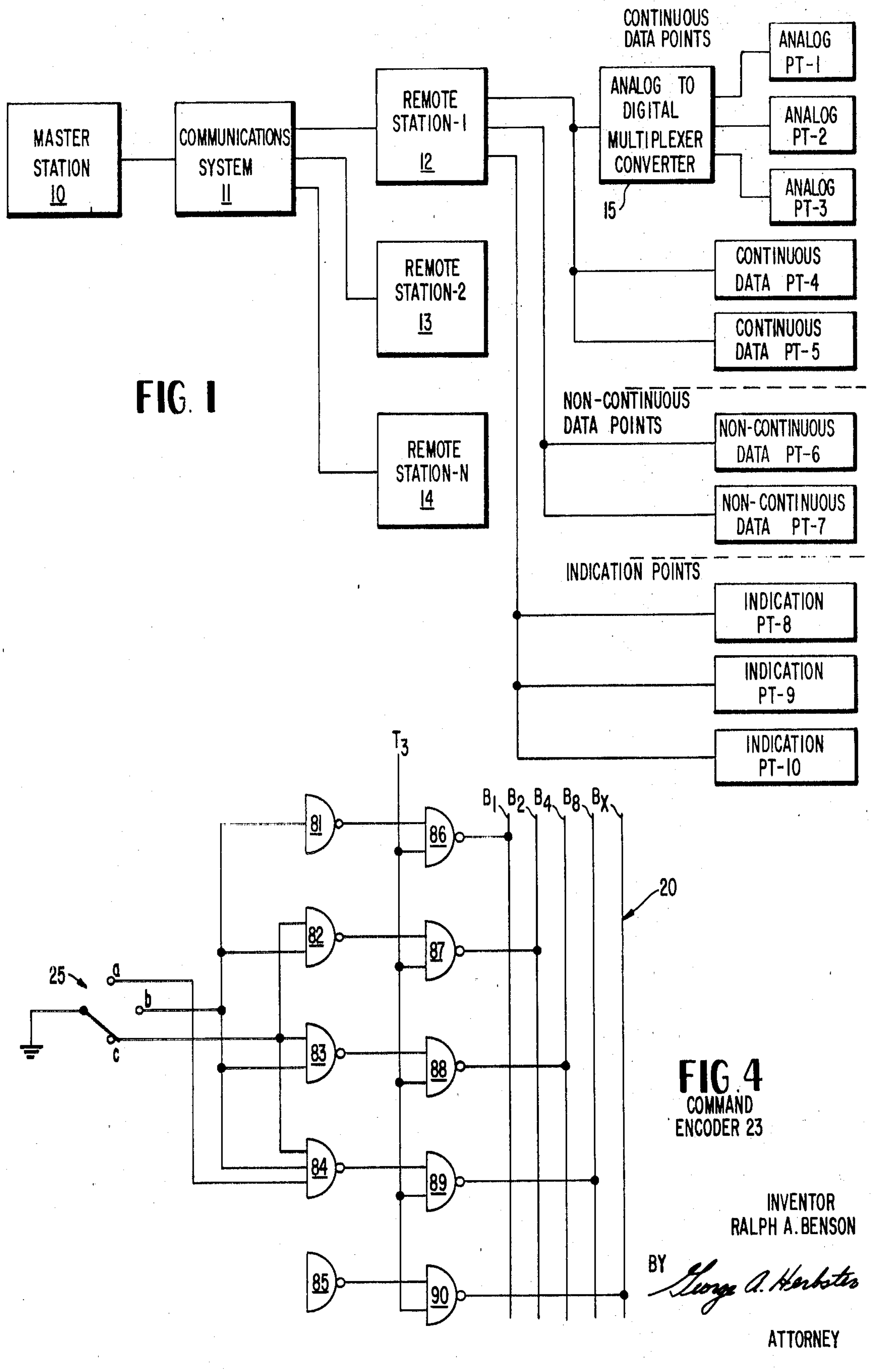
FIG. 1 is a schematic of one embodiment of a digital information transfer system adapted to incorporate this invention.
FIG. 4 is a logic schematic of a command encoder adapted to be utilized in the master station of FIG. 2.

In the following discussion of an examplary supervisory system, like numerals refer to like elements throughout. Referring to FIG. 1, a MASTER STATION 10 is coupled through a COMMUNICATION SYSTEM 11 to a plurality of remote stations. As indicated, any number of remote stations may be controlled or associated with a single MASTER STATION 10. In the exemplary system of FIG. 1 the REMOTE STATION–1, designated by numeral 12, REMOTE STATION–2, designated by numeral 13, and a REMOTE STATION–*n*, designated by numeral 14 are illustrated. Each remote station reacts to commands from the MASTER STATION 10 to return digital information. This information may indicate alarm status, analog values or digital data. For purposes of understanding this invention REMOTE STATION–1 is depicted as controlling 10 points. Three points, ANALOG PT–1, ANALOG PT–2 and ANALOG PT–3, are coupled to REMOTE STATION–1 through an analog-to-digital multiplexer/converter 15. CONTINUOUS DATA PT–4 and CONTINUOUS DATA PT–5 represent means for generating digital information directly from continuously monitored variables. NON-CONTINUOUS DATA PT–6 and NON-CONTINUOUS DATA–PT–7 represent intermittently monitored digital information generating means while INDICATION PT–8, PT–9 and PT–10 generate digital information related to the status of a two-condition device.

Generally, the MASTER STATION 10 sends out a command which includes a remote station address and a request for data. Upon receipt, the addressed REMOTE STATION scans each point in a predetermined sequence and transmits a plurality of data words to the MASTER STATION 10. At the MASTER STATION 10 each data word is decoded to provide an output in the form of a visual or audio display. When all data from the addressed remote station has been received, the MASTER STATION 10 sends a command to another remote station.

Figure 2:
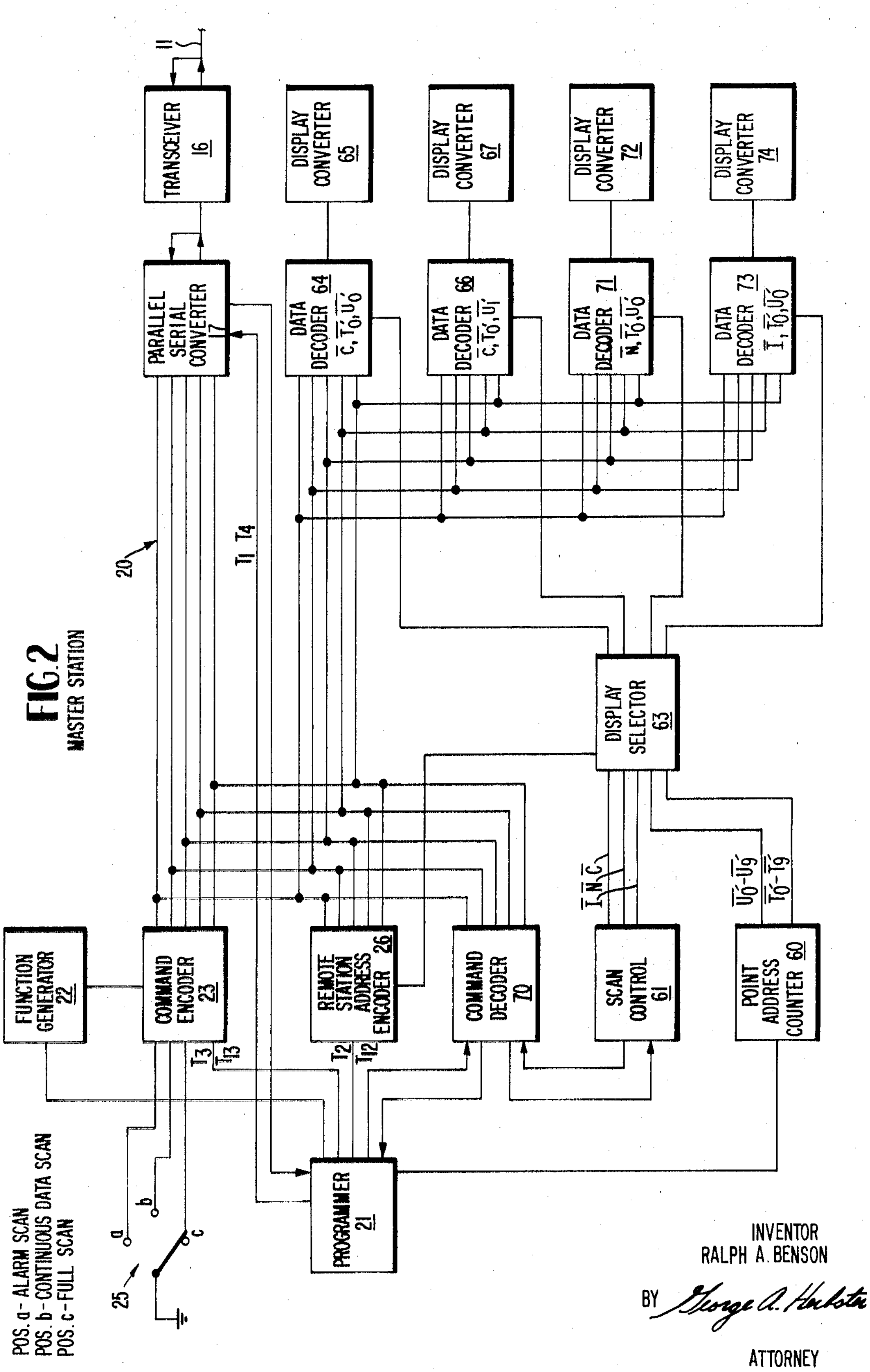
FIG. 2 is a detailed illustration of a master station incorporating certain aspects of this invention and adapted for use in the system of FIG. 1.

Additional details of a master station which embodies this invention are shown in FIG. 2. A TRANSCEIVER 16 is coupled to the COMMUNICATIONS SYSTEM 11 represented as a single line. A PARALLEL-SERIAL CONVERTER 17 is connected between the TRANSCEIVER 16 and master station COMMON BUSSES 20 to convert parallel information on the COMMON BUSSES 20 for serial transmission by the TRANSCEIVER 16. Serially received information from the TRANSCEIVER 16 is also converted to a parallel format for application to the COMMON BUSSES 20. The master station is under control of a PROGRAMMER 21 which generates and receives a plurality of timing pulses and control signals which generates and receives a plurality of timing pulses and control signals which are coupled to and from various other circuits.

When remote point selection or control is desired, a FUNCTION GENERATOR 22 is energized to cause a signal to be transmitted to the PROGRAMMER 21 and to a COMMAND ENCODER 23. If such a function is generated, it takes priority over the normal system operation. It is illustrated to define its relationship with the remainder of the master station.

Scan selection is provided by means functionally illustrated in this specific embodiment as a three-position switch 25. In a first position 25*a*, for alarm scan, each remote station is scanned to determine if any indication points have changed status. If a status change has occurred, the status of each indication point is read. In a second position 25*b*, for continuous data scan, each continuous data point is scanned and then an alarm scan is implemented. In a third position 25*c*, for full scan, the scanning of noncontinuous data points is added to the continuous data scan to be implemented before the alarm scan.

It should be noted that the arrangement of binary numbers in this description is not conventional. The conventional representation of binary numbers requires that the most significant binary digit appear first and that other bits be arranged in order of decreasing numerical significance from left to right. In this description, binary numbers are written in the order in which the digits are transmitted or received by transceiver 16. That is, the least significant binary digit appears first and other bits are arranged in order of increasing numerical significance from left to right.

If the switch 25 is in the third, or full scan position, the COMMAND ENCODER 23 produces an output in the form of a command character on the COMMON BUSSES 20 which may be represented by FSCN. This may be digitally represented by and transmitted as 10001 in binary logic. These are, in order, the $B_1$, $B_2$, $B_4$, $B_8$, and $B_x$ binary bits. In the following discussion, the designations $B_1$ through $B_x$ also define specific bus wires and logic circuits in addition to bits. This command character would be combined with a remote station address character from a REMOTE STATION ENCODER 26 which responds to the PROGRAMMER 21. If the various remote stations are designated by a binary address, the address for REMOTE STATION–1 is 10000; the address for REMOTE STATION–2, 01000; and that for REMOTE STATION–*n* the binary equivalent for its remote station numerical designation. Normally, the address for each remote station will be assigned in an increasing order.

If two characters, each containing five binary bits, will convey sufficient information from the remote station, then it is necessary only to add a sync bit at the beginning of a one-word command message. This message would additionally include the command and remote station address characters and would be adequate to obtain information from each remote station. Normally, however, some form of parity character and bits are generated. If additional data characters are necessary, the data words may be expanded. In the specific embodiment described herein, two additional data characters are returned to the master station in addition to a parity after each character and a parity character at the end of the data. Therefore, thirty-one bit, fixed length, command and data words are transmitted between the remote and master stations. If no data is being transmitted, then the time span for the additional data characters may be transmitted with logic 1's. This is specifically applied to the command word which includes the remote station address character, the command character, two no-data characters and the parity character. No-data characters may be generated in the PARALLEL-SERIAL CONVERTER 31 under control of the PROGRAMMER 21. Therefore, the command word applied to the COMMUNICATIONS SYSTEM 11 under the control of the PROGRAMMER 21 includes a single sync bit, a six-bit remote station address character, a six-it command character, two six-bit no-data characters and a six-bit parity character. Each character is placed on the COMMON BUSSES 20 or into the TRANSCEIVER 16 by the application of timing pulses T1 through T4 with T4 controlling the last three characters. Specifically, if the switch 25 is placed in the third position 25*c*, the PROGRAMMER 21 causes the REMOTE STATION ADDRESS ENCODER 26 to select REMOTE STATION-1 and the following command word is transmitted through the COMMUNICATIONS SYSTEM 11:

$$110000p10001p11111p11111pPPPPPp$$

where 10001 is the command character, *p* indicates the parity bit for each character and PPPPP represents the generated parity character.

Figure 3:
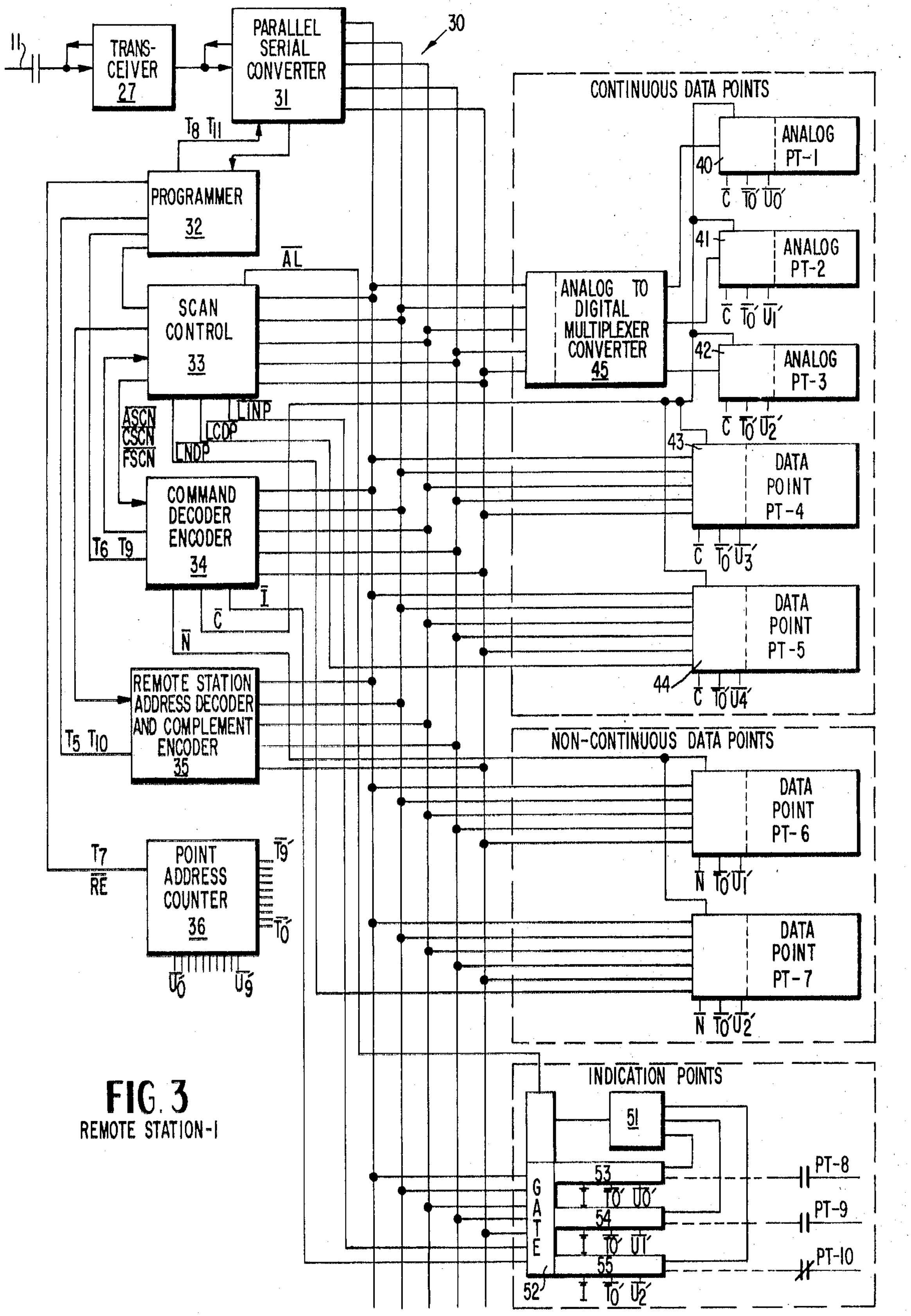
FIG. 3 is a detailed illustration of a remote station incorporating certain aspects of this invention and adapted for use in the system of FIG. 1.

The single-word command message is received by a TRANSCEIVER 27 shown in FIG. 3, and coupled to remote station COMMON BUSSES 30 by a PARALLEL-SERIAL CONVERTER 31. When the sync bit is received by the PARALLEL-SERIAL CONVERTER 31, a signal is transferred to a remote station PROGRAMMER 32. This PROGRAMMER 32 controls the receipt and transmission of information into and from various circuits including a SCAN CONTROL 33, a COMMAND DECODER-ENCODER 34, a REMOTE STATION ADDRESS DECODER AND COMPLEMENT ENCODER 35, and a POINT ADDRESS COUNTER 36. The PROGRAMMER 32 produces timing pulses for each of the circuits in the remote station. The sync bit synchronizes the two PROGRAMMERS. Therefore, in the following discussion, no distinction is maintained as to the origin of a specific timing pulse; and timing pulses T5 and T6 are used to admit the remote station address and command characters to the REMOTE STATION ADDRESS DECODER AND COMPLEMENT ENCODER 35 and COMMAND DECODER-ENCODER 34.

The COMMAND DECODER-ENCODER 34 energizes the SCAN CONTROL 33 and the PROGRAMMER 32 resets the POINT ADDRESS COUNTER–36. Still assuming a full scan operation, the SCAN CONTROL 33 causes a $\overline{C}$ bus from the COMMAND DECODER-ENCODER 34 to energize gates 40 through 44 of the data points ANALOG PT–1 through PT–3 and CONTINUOUS DATA PT–4 and PT–5. Simultaneously the PROGRAMMER 32 energizes the POINT ADDRESS COUNTER 36 having U′ and T′ conductors with a timing pulse T7 to sequentially apply signals to the gates 40 through 44. Hence, in this specific example of a group of continuous data points, the POINT ADDRESS COUNTER 36 advances from$U_0'$ to $U_4'$. Each analog point which is interrogated energizes the analog-to-digital multiplexer/converter 45. Data words are placed on COMMON BUSSES 30 sequentially under the direction of the POINT ADDRESS COUNTER 36 which also controls the transfer digital information from PT–4 and PT–5. CONTINUOUS DATA PT–5 is the last continuous data point. It includes means responsive to the energization thereof by the POINT ADDRESS COUNTER 36 to produce an $\overline{LCDP}$ signal which is transferred to the SCAN CONTROL 33. The SCAN CONTROL 33 responds to the $\overline{LCDP}$ signal by energizing the COMMAND DECODER-ENCODER 34 to thereby energize the $\overline{N}$ bus and simultaneously generate $\overline{INDP}$. PROGRAMMER 32 generates timing pulses T8 through T11 to control the transfer of a synch bit, a command character, $\overline{NCDP}$, indicating that the last continuous data has been transmitted and that non-continuous data follows, the remote station address complement, $\overline{RS}$, and then two no-data characters and a parity character. This constitutes a last-continuous-data word which is transmitted to the master station.

Generation of the $\overline{LCDP}$ signal also causes the SCAN CONTROL 33 to produce an input to the PROGRAMMER 32 which in turn resets the POINT ADDRESS COUNTER 36 to $\overline{T_0'}$, $\overline{U_0'}$, the complemented counter signals, with a signal $\overline{RE}$. As the $\overline{N}$ bus and the $T_0'$, $U_0'$ busses are energized with $\overline{T_0'}$ and $\overline{U_0'}$ signals, NON-CONTINUOUS DATA PT–6 is enabled and transfers digital information onto the COMMON BUSSES 30. Means are also associated with the NON-CONTINUOUS DATA PT–7, to generate a $\overline{LNDP}$ signal. The PROGRAMMER 32 could now recycle to transfer the status of each utilization device monitored by INDICATION PT–8 through PT–10. However, in accordance with another advantage of this system digital means are associated with each indication point to determine if an unauthorized change has occurred. Such a sensor 51 may be connected to a gate 52 and also to each of the digital generators 53, 54 and 55 at each indication point. If one indication point changes status, an alarm signal, $\overline{AL}$, is transmitted to the SCAN CONTROL 33. If an $\overline{AL}$ signal is received, the SCAN CONTROL 33 causes the PROGRAMMER 32 to recycle to transmit a last non-continuous-data word containing an $\overline{INDP}$ character. Thereafter the COMMAND-DECODER-ENCODER 34 and the POINT ADDRESS COUNTER 36 sequentially scan each indication point and a digital word indicating the status is transmitted from digital generators 53 through 55. The digital generator 55, representing the last indication point, produces an $\overline{LINP}$ signal which is transmitted to the SCAN CONTROL 33.

When the SCAN CONTROL 33 senses either the absence of an alarm, $\overline{AL}$, or the $\overline{LINP}$ character, it causes the COMMAND DECODER-ENCODER 34 to generate a last-data character $\overline{REND}$, and again cycle the PROGRAMMER through T8 to T11. The transmission of the sync bit, the $\overline{REND}$ command, the remote station address complement, the two no-data characters and the parity character constitutes a last-data word which is transmitted by the PARALLEL-SERIAL CONVERTER 31 and the TRANSCEIVER 27 back to the master station.

Therefore, in this specific embodiment, the remote station has responded to a single command word from the master station to produce a plurality of continuous data words, a last-continuous-data-word, a plurality of non-continuous-data words, a last-non-continuous-data word, a plurality of indication point status words, and a last-data word. As will be obvious, the generation of the last-continuous-data, last-non-continuous-data and last-data-words permits substantially continuous energization of the COMMON BUSSES 30 and hence the COMMUNICATION SYSTEM 11, with digital information.

Data from the remote stations is converted to parallel format for the COMMON BUSSES 20 by the TRANSCEIVER 16 and the PARALLEL-SERIAL CONVERTER 17. Receipt of a sync bit in the PARALLEL-SERIAL CONVERTER 17 when the full scan operating mode is selected indicates to the PROGRAMMER 21 that continuous data words are being received. The PROGRAMMER 21 has already set a POINT ADDRESS POINT COUNTER 60 to generate $\overline{T'_0}$ and $\overline{U'_0}$ signals and a SCAN CONTROL 61 to $\overline{C}$. These two signals are coupled to a DISPLAY SELECTOR 63 which is responsive to a unique combination of the signals to energize one specific data decoder. Therefore, as the following data characters are placed on the COMMON BUSSES 20, they are conveyed to a single data decoder such as the DATA DECODER 64 which initially responds to a signal $\overline{C}$, $\overline{T'_0}$, $\overline{U'_0}$. This information is then transferred to a DISPLAY CONVERTER 65 such as a log sheet printer, a cathode ray tube display, a process computer or other utilization device.

When the sync bit preceding the second word of continuous data is received, the PROGRAMMER 21 advances the POINT ADDRESS COUNTER 60 to $\overline{T'_0}$, $\overline{U'_1}$. The DISPLAY SELECTOR 63 responds to $\overline{C}$, $\overline{T'_0}$, $\overline{U'_1}$ and energizes a DATA DECODER 66 so that a second DISPLAY CONVERTER 67 is energized. This continues until a last-continuous data word is received by the PARALLEL-SERIAL CONVERTER 17.

During reception of every message from the remote station, a COMMAND DECODER 70 in the master station is energized. It is responsive to the $\overline{NCDP}$, $\overline{INDP}$ and $\overline{REND}$ characters on the COMMON BUSSES 20. When the $\overline{NCDP}$ character is received, the COMMAND DECODER 70 responds by causing an $\overline{N}$ bus from the SCAN CONTROL 61 to be energized and also causes the PROGRAMMER 21 to reset the POINT ADDRESS COUNTER 60 to $\overline{T'_0}$, $\overline{U'_0}$. Therefore, a DATA DECODER 71, which is connected to the COMMON BUSSES 20 by the receipt of $\overline{N}$, $\overline{T'_0}$, $\overline{U'_0}$ at the DISPLAY SELECTOR 63, produces an output on a DISPLAY CONVERTER 72. Succeeding non-continuous data words are conveyed to other display converters until either the last non-continuous data word with the $\overline{INDP}$ character or the last-data word with the REND character is received. If the $\overline{INDP}$ character is received, the SCAN CONTROL 61 energizes an $\overline{I}$ bus and resets the POINT ADDRESS COUNTER 60 so that a first indication point DATA DECODER 73 is coupled to the COMMON BUSSES 20 to energize a DISPLAY CONVERTER 74. When the COMMAND DECODER 70 is energized by the last-data character $\overline{REND}$, another signal is transferred to the PROGRAMMER 21 to cause the POINT ADDRESS COUNTER 60 to be reset to $\overline{T'}_0$, $\overline{U'}_0$ and the POINT STATION ADDRESS ENCODER 26 and COMMAND ENCODER 23 to transmit another command word to the next remote station in sequence. Additional data decoders and display converters are located at the master station so that another group of display converters are energized in response to signal from REMOTE STATION–2.

In accordance with the objects and advantages of this invention, the master station has been continuously energized during the receipt of three different types of data transmissions from the remote station. Further, this has been accomplished even though different numbers of continuous, non-continuous and indication point data words were transmitted. By generating last-continuous-data, last-non-continuous-data and last-data words, the system is constantly active. At no time does the master station listen to a quiet or non-energized COMMUNICATION SYSTEM 11.

While many circuit embodiments may be utilized to perform each function discussed with reference to FIGS. 1 through 3, certain of the circuits involved in the master station and the remote station are better understood by referring to detailed logic diagrams thereof. It is considered that the PROGRAMMERS 21 and 32, the PARALLEL-SERIAL CONVERTERS 17 and 31, the TRANSCEIVERS 16 and 27 and the POINT ADDRESS COUNTERS 36 and 60 are well known in the art and require no additional discussion. Similarly the ANALOG-TO-DIGITAL MULTIPLEXER/CONVERTER 45 and the various digital generators associated with each of the points PT–1 through PT–10 in the remote station are known in the art.

One master station circuit, the COMMAND ENCODER 23 is specifically illustrated in FIG. 4 and includes a plurality of NAND circuits 81 through 85. The rotor of switch 25 selectively grounds terminals 25*a*, 25*b* and 25*c*. Terminal 25*a* is connected to the NAND circuit 84; terminal 25*b*, to the NAND circuits 81 through 84; and terminal 25*c*, to the NAND circuits 82 through 84. Each of the NAND circuits 81 through 85 is coupled to the COMMON BUSSES 20 and specifically to the busses $B_1$, $B_2$, $B_4$, $B_8$ and $B_x$ by NAND circuits 86 through 90. These NAND gates are also energized by the timing pulse T3 to invert the output of the NAND circuits 81 through 85. Therefore, when the terminal 25*a* is grounded, the NAND circuits 81, 82, 83 and 85 produce the zero outputs while the NAND circuit 84 generates a logic 1 output. The resulting five-bit character which appears on the COMMON BUSSES 20 is 11101 which is defined as the alarm scan command character, ASCN. When terminal 25*b* is grounded, a character 00001, CSCN, is generated. Grounding terminal 25*c* produces the FSCN character 10001. The generated command character is transmitted with the remote station address encoded by the REMOTE STATION ADDRESS ENCODER 26 in response to a timing pulse T2. The remote station address character may be generated by circuitry which is similar to that in the COMMAND ENCODER 23 where means equivalent to the switch 25 are advanced sequentially by the PROGRAMMER 21 to generate the remote station character. Therefore, the generation of timing pulses T1 through T4 causes the command word to be generated by the master station and then placed on the COMMUNICATIONS SYSTEM 11.

Figure 5:
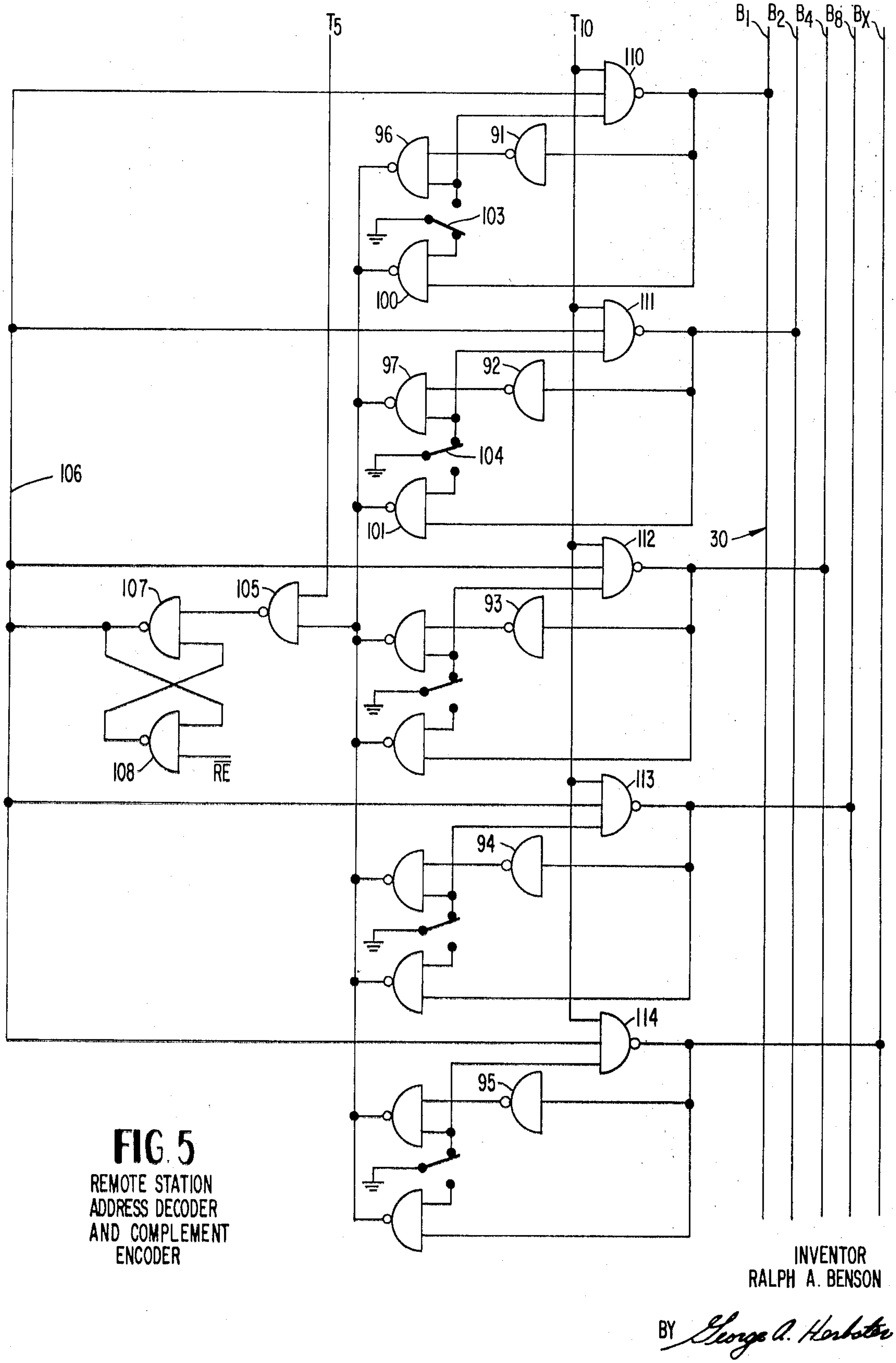
FIG. 5 is a logic schematic of remote station address decoder and complement encoder adapted to be utilized in the remote station of FIG. 3.

At the remote station shown in FIG. 3 the remote station character is decoded and, as described hereinabove the remote station address complement is generated for subsequent transmission to the master station with the last-continuous-data, last-non-continuous-data and last-data words. Such a remote station address decoder and complement encoder is shown in FIG. 5. As the decoder and encoder portions are interrelated, the entire operation is discussed beginning with the remote station address character as it is received from the master station. All characters which appear on the COMMON BUSSES 30 are applied in parallel to inverters 91 through 95 which are connected respectively to the $B_1$, $B_2$, $B_4$, $B_8$ and $B_x$ busses.

The following detailed discussion is limited to the circuitry energized by the $B_1$ and $B_2$ busses connected to the inverters 91 and 92 because this circuitry represents the processing of a logic 1 and a logic 0. Each of the inverters 91 through 95 energizes a NAND circuit, such as NAND circuits 96 and 97. Further, each of the COMMON BUSSES 30 impresses a signal on a second plurality of NAND circuits. For example, the $B_1$ bus also energizes a NAND circuit 100. Another NAND circuit 101 is energized by the signal on the $B_2$ bus. Switches 103 and 104 are representative of selector switches to set the remote station address.

Selection switch 103 grounds the second input of the NAND circuit 100 while the second input to the NAND circuit 96 floats at logic 1. Therefore, when the $B_1$ bus is at logic 1, NAND circuits 96 and 100 are each energized by a logic 1 signal and a logic 0 signal so both outputs of NAND circuits 96 and 100 go to logic 1. Grounding the second input of the NAND circuit 97 through the selector switch 104 causes both outputs of the NAND circuits 97 and 101 to go to logic 1 when the $B_2$ bus is at logic 0. An analysis of the remaining circuitry indicates that the input to a NAND circuit 105 is at a logic 1 only when a digital message 10000 appears on the COMMON BUSSES 30. An output conductor 106 energized by a latch including NAND circuits 107 and 108 is therefore maintained at a logic 1 if the common input to the NAND circuit 105 is at a logic 1 when T5 is generated. Conductor 106 remains at logic 1 until $\overline{RE}$ is applied to the NAND circuit 108.

The conductor 106 also serves as one input to a plurality of three-input NAND circuits 110 through 114. A second input is provided from the second input of each NAND circuit in the remote station address decoder portion energized by the inverters 91 through 95. Specifically, the second input to the NAND circuit 110 is a logic 1 because it is not grounded by the selector switch 103. The second input of the NAND circuit 111 is maintained at a logic 0 by the grounded input of the NAND circuit 97. Similarly, second inputs of the NAND circuits 112 through 114 are at logic 0. Therefore, when a timing pulse T10 is applied simultaneously to a third input of all the NAND circuits 110 through 114, a logic 1 is generated by the NAND circuits 111, 112, 113 and 114 while the NAND circuit 110 generates a logic 0. Therefore, the remote station address is complemented and transmitted as 01111.

Figure 6:
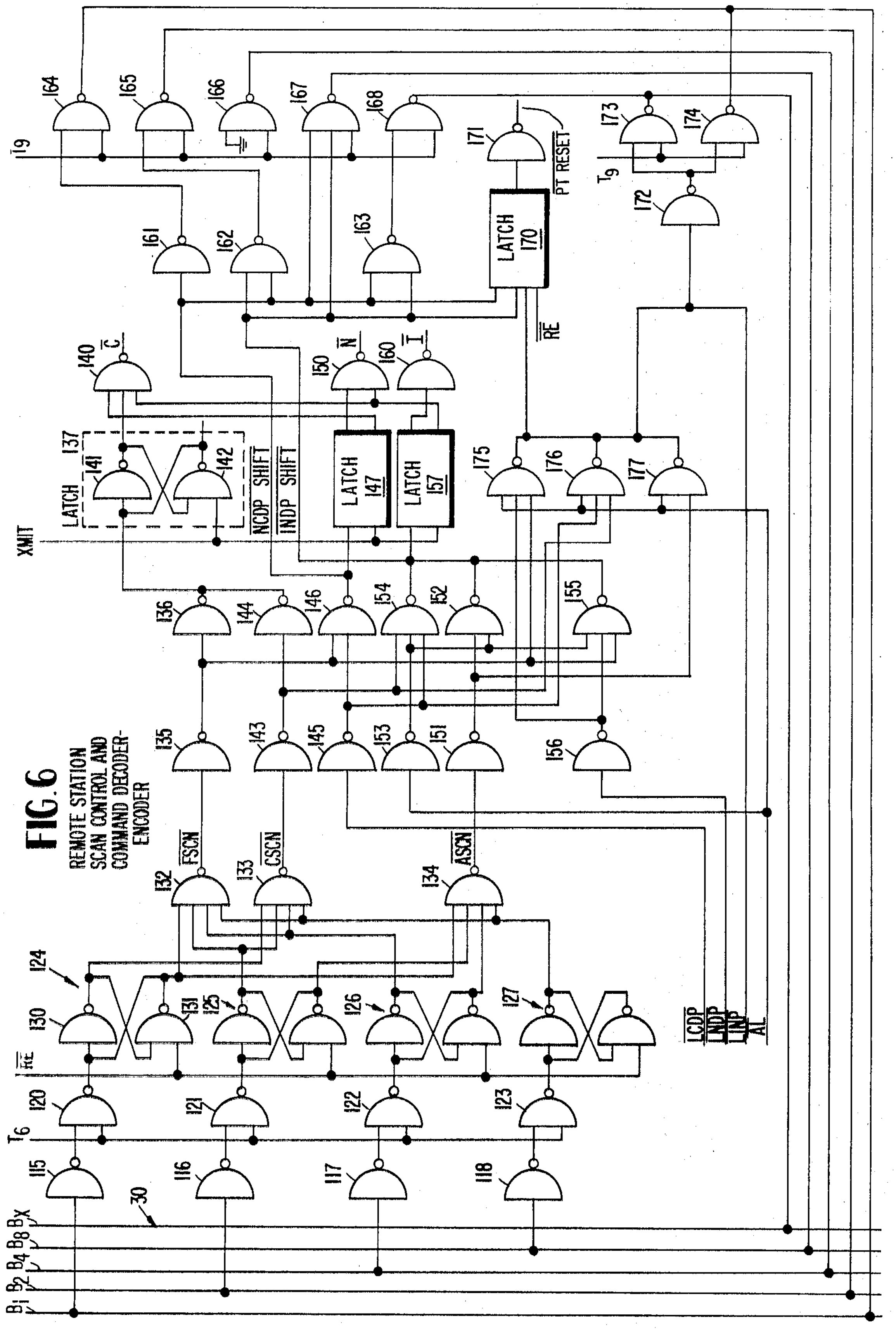
FIG. 6 is a logic schematic of a scan control, command decoder and command encoder adapted to be utilized in the remote station of FIG. 3.

The basic control of the remote station operation in response to a command from the master station is provided by the SCAN CONTROL and the COMMAND DECODER-ENCODER shown in FIG. 6. COMMON BUSSES 30 are individually connected to inverters 115 through 118 which form a part of the COMMAND DECODER. The $B_x$ bus is not connected to any inverter because in this specific embodiment all command codes terminate with a logic 1 thereby eliminating a requirement for logic circuitry. However, as will be obvious, a fifth section could be connected to the $B_x$ bus. Each of the inverters 115 through 118 is individually connected to one of a plurality of NAND circuits 120 through 123 which are additionally energized by the timing pulse T6. The outputs of the NAND circuits 120 through 123 are coupled to latches 124 through 127 with the latch 124 specifically including NAND circuits 130 and 131. The output of the NAND circuit 120 is applied as a single input to the NAND circuit 130. The output is then coupled to one input of the NAND circuit 131 while the output of the NAND circuit 131 is coupled ot the single input of the NAND circuit 130. As a result, the latch 124 produces a $\overline{B_1}$ and $B_1$ signal. Latches 125 through 127 produce $\overline{B_2}$, $B_2$, $\overline{B_4}$, $B_4$, $\overline{B_8}$ and $B_8$. Each latch is uniquely connected to one of a plurality of NAND circuits 132 through 134 which are responsive to three particular messages to generate FSCN, CSCN and ASCN signals. Specifically, the NAND circuit 132 is adapted for energization by $B_1$, $\overline{B_2}$, $\overline{B_4}$ and $\overline{B_8}$. Therefore, the output of the NAND circuit 132 goes to logic 0 when the busses are energized by 1000. The NAND circuit 133 is connected to be energized by $\overline{B_1}$, $\overline{B_2}$, $\overline{B_4}$ and $\overline{B_8}$ so that the CSCN signal goes to logic 0 when 0000 is received. The NAND circuit 134 is connected to the $B_1$, $B_2$, $B_4$ and $\overline{B_8}$ busses to be responsive to 1110.

Each of the NAND circuits 132 through 134 are connetced to the SCAN CONTROL. The output of the NAND circuit 132 is coupled through inverters 135 and 136 and a latch 137 to serve as one input to a NAND circuit 140. Latch 137 serves as an example for an additional two latches shown in FIG. 6. It includes a NAND circuit 141 and a NAND circuit 142. The NAND circuit 141 serves as an inverter and is directly connected as a first input to the NAND circuit 140. The NAND circuit 142 has two inputs including the output from the NAND circuit 141 and a control pulse XMIT which is generated by the PROGRAMMER 32 and is at a logic 1 during word transmission. The output of the NAND circuit 142 is coupled back to the single input of the NAND circuit 141. Therefore, if the first input to the latch 137, which energizes the NAND circuit 141, is at logic 1, the first output is a logic 0 and energizes one input of the NAND circuit 142. If the output of NAND circuit 132 or 133 is logic 0, the output of the inverter 136 is a logic 0. During transmission, one input to the NAND circuit 140 is logic 1. At the end of each transmission, XMIT goes to logic 0 to permit the input to the NAND circuit 141 to go to logic 1 if the output of the NAND circuit 132 or 133 has changed. Hence, the latch 137 tends reset at the end of each word transmission. The output of the NAND circuit 142 serves as a second output in the remaining latch shown in FIG. 6 and it is always a complement of the first output.

When the remote station begins scanning in the full scan mode, both NAND circuits 133 and 134 are at logic 1. The output of the NAND circuit 133 is coupled through inverters 143 and 144 to the input of the latch 137. Although the output of the inverter 144 tries to go to logic 1, it is overridden by the logic 0 output of the inverter 136. During the transmission of continuous data, the $\overline{\text{LCDP}}$ signal, at logic 1, is transmitted through an inverter 145 to a NAND circuit 146 which is also energized by the output of the inverter 135. Therefore, in the full scan mode the output of the inverter 146, $\overline{\text{NCDP}}$ $\overline{\text{SHIFT}}$, is at logic 1. A latch 147, constructed similarly to the latch 137, produces a logic 0 output at a first output when the output of the inverter 146 is a logic 1 so an $\overline{\text{N}}$ signal of logic 1 is produced by a NAND circuit 150. The second output of the latch 147, a logic 1, serves as a second input to the NAND circuit 140. Similarly, the logic 1 on the NAND circuit 134 is transferred through an inverter 151 to a NAND circuit 152. If an indication point status has changed, $\overline{\text{AL}}$ is at a logic 0. A logic 1, produced by an inverter 153, is coupled to the NAND circuit 152 and to NAND circuits 154 and 155. The NAND circuit 152, being energized by a logic 0 from the inverter 151 tends to shift to logic 1. The NAND circuit 154 is additionally energized by the outputs of the inverter 143 so its output tends to shift to logic 1. Finally, the NAND circuit 155 is energized by the $\overline{\text{LNDP}}$ signal which is a logic 0 after it passes through an inverter 156. Therefore, the common output of the NAND circuits 152, 154 and 155 a logic 1, sets a latch 157 so that a first input coupled through an inverter 160, produces an $\overline{\text{I}}$ signal of logic 1. The second output from the latch 157 is also coupled to the NAND circuit 140. Therefore, the output of the NAND circuit 140 is at logic 0 while the outputs of the NAND circuits 150 and 160 are at logic 1, so that a $\overline{\text{C}}$ signal of logic 0 exists.

While the last continuous data point is being read out, the $\overline{\text{LCDP}}$ signal is at logic 0 and the XMIT signal is at logic 1. Both inputs of the gate 146 are at logic 1 so the output goes to logic 0. With XMIT at logic 1, the logic signals on the latch 147 reverse. Therefore, $\overline{\text{N}}$ goes to logic 0. With the second output of the latch 147 at logic 0, the NAND circuit 140, and $\overline{\text{C}}$, go to logic 1. The latches 137 and 157 remain unchanged.

The output of the NAND circuit 146 is also tied to the COMMAND ENCODER to generate an $\overline{\text{NCDP}}$ $\overline{\text{SHIFT}}$ signal which is fed to an inverter 161 and NAND circuits 162 and 163. The command characters are generated in response to timing pulse T9 and applied to a plurality of NAND circuits 164, 165, 166, 167 and 168. The NAND circuit 164 is energized by the output of the inverter 161 while the NAND circuit 165 is responsive to the NAND circuit 162 and is a logic 1 only when $\overline{\text{NCDP}}$ $\overline{\text{SHIFT}}$ or $\overline{\text{INDP}}$ $\overline{\text{SHIFT}}$ are logic 0. The NAND circuit 166 has a grounded input. NAND circuit 167 has two inputs individually connected to the inputs of the inverter 161 and the NAND circuit 162 to be responsive to $\overline{\text{NCDP}}$ $\overline{\text{SHIFT}}$ and $\overline{\text{INDP}}$ $\overline{\text{SHIFT}}$. Both of these signals are also connected to the NAND circuit 163 and the output of the NAND circuit 163 energizes one input of the NAND circuit 168. As $\overline{\text{NCDP}}$ $\overline{\text{SHIFT}}$ is a logic 0 when $\overline{\text{LCDP}}$ is at logic 0, the application of a timing pulse T9 produces a logic 0 on the output of NAND circuits 164 and 168 and a logic 1 on the outputs of the NAND circuits 165 and 167. NAND circuit 166 always generates a logic 1. Therefore, the application of a timing pulse T9 by the PROGRAMMER 32 in FIG. 3 in response to the generation of the $\overline{\text{LCDP}}$ signal causes an $\overline{\text{NCDP}}$ character of 00110 to be transmitted onto the COMMON BUSSES 30 to be returned for resetting the master station. Whenever the $\overline{\text{NCDP}}$ $\overline{\text{SHIFT}}$ signal of the output of the NAND circuit 146 goes to logic 0, it sets a latch 170 to logic 1 until a reset signal $\overline{\text{RE}}$ occurs. This is fed to an inverter 171 to produce a $\overline{\text{PT-RESET}}$ signal which is transmitted back to the PROGRAMMER 32 shown in FIG. 3 to reset the POINT ADDRESS COUNTER 36.

Non-continuous data is now transmitted until the last non-continuous-data point is interrogated thereby producing the $\overline{\text{LNDP}}$ signal. All inputs to the NAND circuit 155 are energized with logic 1 signals so the input to the latch 157 goes to logic 0 while the input to the latch 147 goes to logic 1. Therefore, both NAND circuits 140 and 150 go to logic 1 while the output of the inverter 160, the $\overline{\text{I}}$ signal, goes to logic 0. Furthermore, the $\overline{\text{INDP}}$ $\overline{\text{SHIFT}}$ signal at logic 0 and the $\overline{\text{NCDP}}$ $\overline{\text{SHIFT}}$ signal at logic 1 energize the COMMAND ENCODER to generate an $\overline{\text{INDP}}$ character of 10110 and transmit it onto the COMMON BUSSES 30.

When the last indication point has been interrogated, the $\overline{\text{LINP}}$ signal is generated and applied to an inverter 172 which energizes a single input of NAND circuits 173 and 174 to produce, with the application of timing pulse T9, logic 0 outputs on the $B_1$ and $B_x$ busses so that a $\overline{\text{REND}}$ character of 01110 is placed on the COMMON BUSSES–30. Simultaneously the $\overline{LINP}$ signal is applied to the latch 170 to produce the $\overline{PT}$ $\overline{RESET}$ signal. As indicated previously, the reception of the $\overline{REND}$ character by the master station shown in FIG. 2 causes the next remote station in sequence to be interrogated.

If the switch 25 in FIGS. 2 and 4 grounded the terminal 25*b*, the resulting command character would be decoded to shift the NAND circuit 133 to logic 0. As previously defined, this means that the non-continuous data points would not be interrogated. With the NAND circuit 133 producing a logic 0, a logic 0 is again applied to the latch 137 which, after reset, produces a logic 1 input to the NAND circuit 140 along with logic 1 inputs from the latches 147 and 157 to produce a $\overline{C}$ signal. When the last continuous data point is interrogated, the $\overline{LCDP}$ signal applies a logic 1 input to the NAND circuit 146. The output of the inverter 135, a logic 0, is the second input of the NAND circuit 146, $\overline{NCDP}$ $\overline{SHIFT}$ therefore remains at logic 1. As the outputs of the inverters 143, 145 and 153 are all at logic 1, the latch 157 generates a logic 1 output which is transmitted through the inverter 160 as $\overline{I}$, a logic 0 and applied to the NAND circuits 140 and 150. This blocks $\overline{C}$ and $\overline{N}$ from going to logic 0 and permits $\overline{I}$ to go to logic 0. The $\overline{INDP}$ $\overline{SHIFT}$ signal is also at logic 0 so the $\overline{INDP}$ character, 10111, and $\overline{PT}$ $\overline{RESET}$ signal are transmitted. Thereafter, actuation is the same as in the full scan operating mode.

When the switch 25 in FIG. 2 grounds terminal 25*c*, the NAND circuit 134 goes to logic 0 while the inverter 151 shifts to logic 1. With $\overline{AL}$ at logic 0, the NAND circuit 152 goes to a logic 1 which produces an $\overline{I}$ signal of logic 0; both the $\overline{N}$ and $\overline{C}$ signals shift to logic 1. Hence, the circuit is limited to merely scanning alarms.

The previous discussion of the circuitry in FIG. 6 has assumed that an alarm exists. If no such change has occurred, then it may not be necessary to print out the entire group of indication points. A NAND circuit 175 is connected to be energized by the $\overline{AL}$ signal as are the additional NAND circuits 176 and 177. The NAND circuit 175 has a second input connected to the output of the NAND circuit 135, while the third input is connected to the output of the inverter 156. The NAND circuit 176 is connected to the output of the NAND circuit 143 and to the output of the inverter 145. The second input to the NAND circuit 177 is connected to the output of the inverter 151. The output of three NAND circuits 175 through 177 are then connected in common and to the single input of the inverter 172. If the system is in the full scan operating mode, then when the last non-continuous data point is interrogated, the output of the NAND circuit 175 will go to logic 0 if no alarms are present. This causes the energization of the inverter 172 with a logic 0 which overrides the logic 1 presented by the $\overline{LINP}$ signal. A $\overline{REND}$ character is generated and placed on the COMMON BUSSES 30. Similarly, in the CSCN or the ASCN modes, the absence of an alarm signal will cause the $\overline{REND}$ character to be generated and permit the master station programmer to advance the system. The circuitry in FIG. 6 requires three control signals, specifically identified as $\overline{LCDP}$, $\overline{LNDP}$ and $\overline{LINP}$, which are transmitted from the last point in each of the continuous data, non-continuous-data and indication point sections. To illustrate how these signals are generated and also one particular embodiment for scanning a plurality of points, FIG. 7 illustrates the necessary control circuitry for points PT–1 through PT–10.

Figure 7:
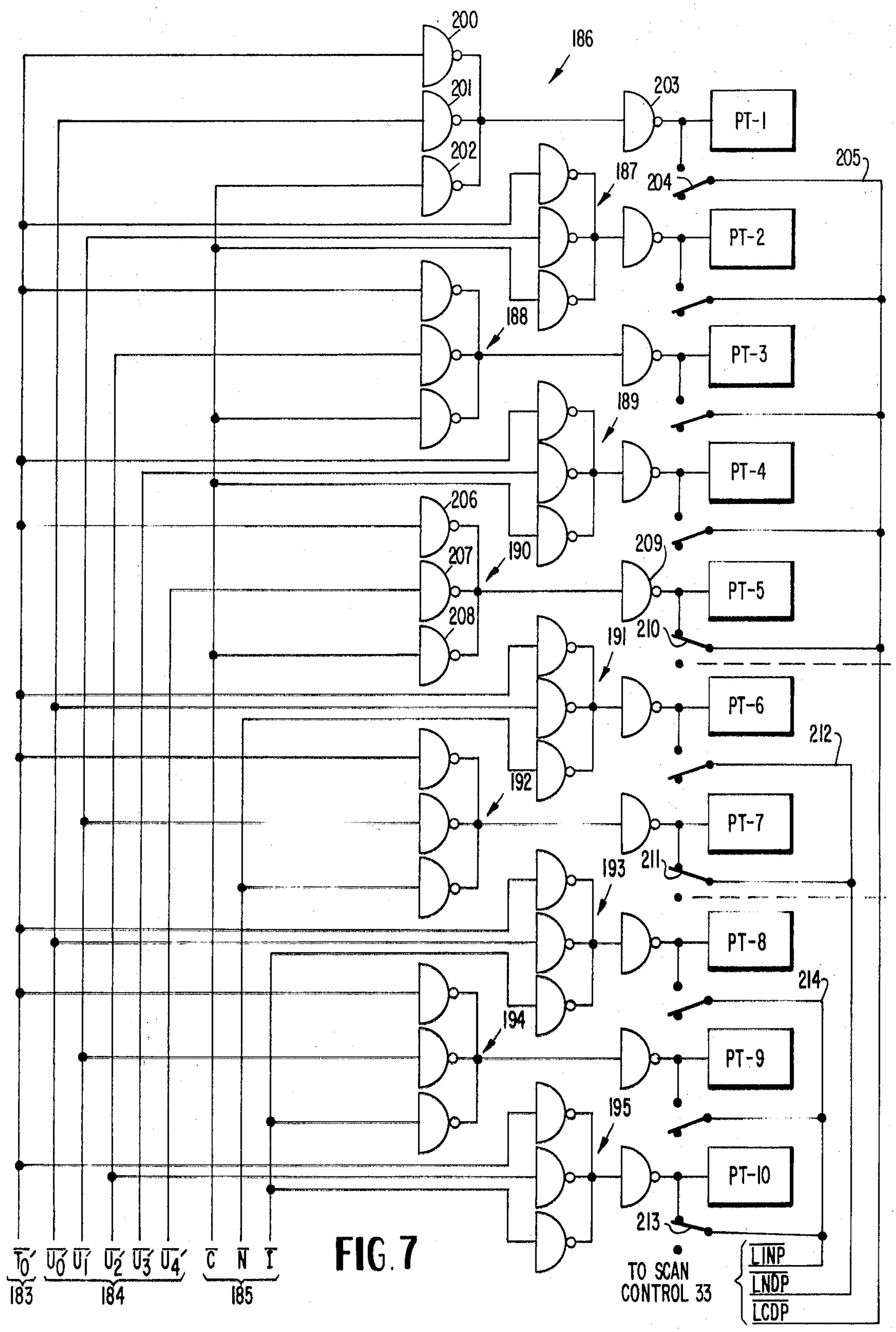
FIG. 7 is a logic schematic of digital information points adapted to be utilized with the remote station of FIG. 3.

Three sets of conductors 183, 184 and 185 and shown as being applied to the circuit in FIG. 7. The conductor in group 183 is the $\overline{T_0'}$, conductor from the POINT ADDRESS COUNTER 36 shown in FIG. 3 while the conductor group 184 represents the $\overline{U_0'}$ through $\overline{U_4'}$ conductors. The group 185 is constituted by the $\overline{C}$, $\overline{N}$ and $\overline{I}$ conductors from the COMMAND DECODER-ENCODER 34 shown in FIG. 2. As described briefly hereinabove, points PT–1 through PT–5 represent the continuous data points, while PT–6 and PT–7 represent non-continuous data points. PT–8 through PT–10 are indication points. Point selector circuits are associated with each point and these are generally designed by numerals 186 through 195. Referring specifically to the selector circuit 186, a plurality of inverters 200 through 202 are connected to the $\overline{T_0'}$, $\overline{U_0'}$ and C conductors respectively. Therefore, when the POINT ADDRESS COUNTER is at $\overline{T_0'}$, $\overline{U_0'}$ in the $\overline{C}$ mode, all three inputs are at a logic 0 causing an inverter 203 to shift to logic 0, thereby energizing PT–1. The output of the inverter 203 is also coupled to one terminal of a switch 204. The other terminal may be left open while the common is connected to a conductor 205. When the switch 204 is in the position shown, it causes the conductor 205 to be at a logic 1. At the last continuous data point, PT–5, inverters 206, 207 and 208 respond to the $\overline{T_0'}$, $\overline{U_4'}$ and $\overline{C}$ signals to cause the output to be inverted in an inverter 209 to place the input to PT–5 at logic 0. A switch 210 couples the conductor 205 to the output of the inverter 209 so that when the point PT–5 is selected, the conductor 205 is driven to logic 0. This is the $\overline{LCDP}$ signal. Similarly, a switch 211 is associated with PT–7 and its selector 192 to drive a conductor 212 to logic 0 thereby generating the $\overline{LNDP}$ signal. Another switch 213 associated with PT–10 couples the input to a conductor 214 to generate the $\overline{LINP}$ signal when a point PT–10 is selected.

Therefore, in accordance with this specific embodiment, the POINT ADDRESS COUNTER 36 and the SCAN CONTROL 33 with the COMMAND DECODER-ENCODER 34 initially generates a $\overline{C}$ signal in the full scan operating mode. The PROGRAMMER 32 shown in FIG. 3 advances the POINT ADDRESS COUNTER 36 until point PT–5 is selected whereupon the $\overline{LCDP}$ signal is generated and transferred back to the SCAN CONTROL 33. The POINT ADDRESS COUNTER 36 is reset to $\overline{T_0'}$, $\overline{U_0'}$ and the $\overline{N}$ conductor is energized. The POINT ADDRESS COUNTER 36 advances to $\overline{T_0'}$, $\overline{U_1'}$ when the $\overline{LNDP}$ signal is generated. If an alarm signal is present then the POINT ADDRESS COUNTER 36 steps through points PT–8 through PT–10. Selection of point PT–10 then produces the signal $\overline{LINP}$ so the REND character is generated.

Therefore, FIGS. 5, 6 and 7 illustrate the basic control circuitry utilized in this specific embodiment of a remote station which responds to a command word from the master station to generate digital data words which are transmitted back to the master station. It will also be obvious that any number of data transmission schemes can be implemented. In this specific embodiment six possible data messages can be transmitted to the master station. In a full scan mode, the remote station will send out the continuous, non-continuous and indication point data in a message which additionally includes last-continuous-data, last-non-continuous-data and last-data words. If no alarms occur, the last-data word is immediately transmitted after the last non-continuous data is transmitted. Therefore, it will be obvious that in a given operating mode the message length from any specific remote station may vary. Further, if the operating mode is changed the length of the message will vary. In the continuous scan mode specifically described none of the non-continuous data points are monitored while in the alarm scan mode neither the continuous nor non-continuous data points are monitored. Further if no alarm occurs, no indication points will be monitored. Therefore, the remote station specifically illustrated in FIG. 7 is capable of transmitting a message containing between 0 and 10 data words. However, at all times information or control words are being transmitted. Therefore, digital information is transferred in a steady stream of digital words to the master station and the master station responds to the receipt of this digital information continuously to provide display. It is necessary therefore to discuss in some detail the COMMAND DECODER 70 and SCAN CONTROL 61 shown in FIG. 2 together with a DISPLAY SELECTOR 63 and one DATA DECODER 64.

Figure 8:
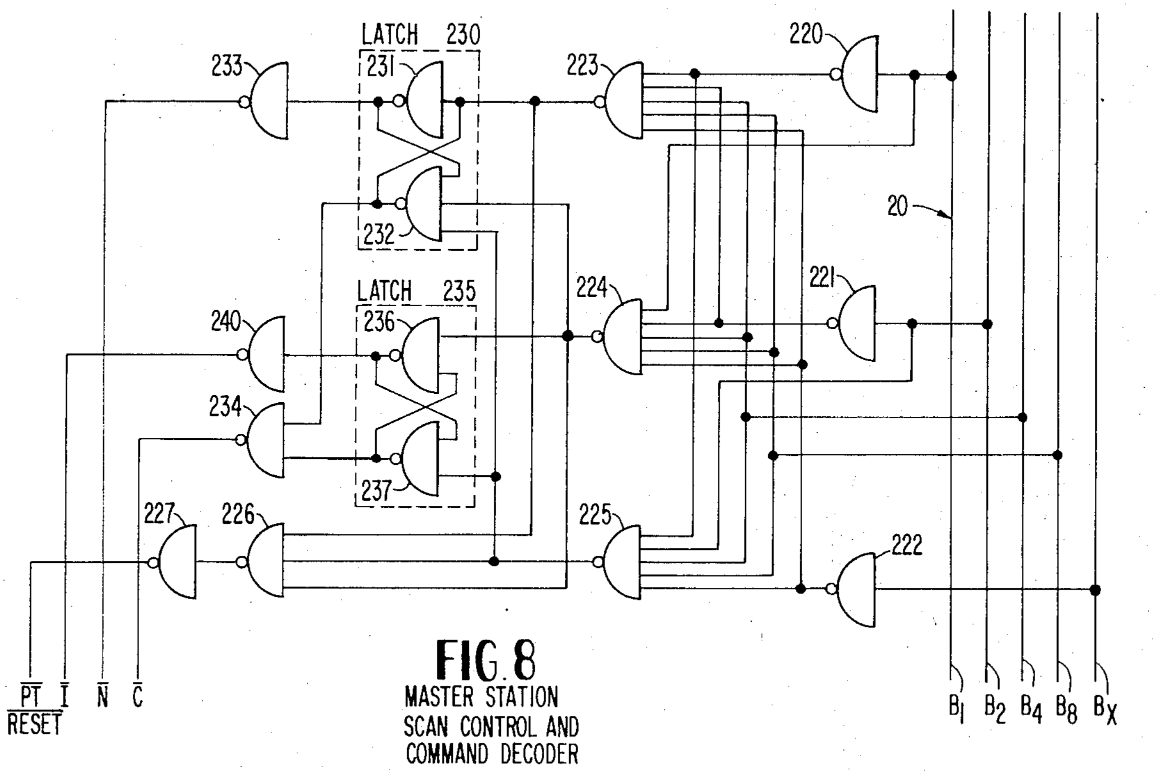
FIG. 8 is a logic schematic of a scan control and command decoder circuit adapted to be utilized in the master station of FIG. 2.

FIG. 8 is a logic diagram of a master station SCAN CONTROL and COMMAND DECODER connected to the COMMON BUSSES 20. As only the $B_1$ and $B_2$ bits shift between logic 1 and logic 0 for each of the three command characters from the remote station, an inverter 220 is connected to the $B_1$ bus and an inverter 221, to the $B_2$ bus. For purposes which will become evident, an inverter 222 is connected to the $B_x$ bus notwithstanding the fact that for all commands of interest the $B_x$ bus is at logic 0. Three NAND circuits 223, 224 and 225 serve to decode each message received on the COMMON BUSSES 20 and to generate a $\overline{C}$, $\overline{N}$ or $\overline{I}$ signal for transmission to the PROGRAMMER 21. NAND circuit 223 has an input connected to the output of the inverter 220 and the output of the inverter 221. Two additional inputs are directly coupled to the $B_4$ and $B_8$ busses while the fifth input thereof is coupled through the inverter 222 to the $B_x$ bus. If the NCDP command character 00110 appears on the COMMON BUSSES 20, all inputs to the NAND circuit 223 will be at logic 1. Similarly, the NAND circuit 224 has inputs connected to the $B_1$ $B_4$, and $B_8$ busses and to the inverters 221 and 222 so it shifts to logic 0 with receipt of the INDP command character, 10110. Finally, the NAND circuit 225 has inputs connected to the inverters 220 and 222 and the $B_2$, $B_4$ and $B_8$ busses so it goes to logic 0 when the COMMON BUSSES 20 are energized by the $\overline{\text{REND}}$ character, 01110. Whenever one of the NAND circuits 223, 224 or 225 shifts from a logic 1 to a logic 0, the output of a NAND circuit 226 and an inverter 227 shifts to logic 0. This is a master station $\overline{\text{PT RESET}}$ signal which is coupled to the PROGRAMMER 21.

When the first data word is received by the master station, all three NAND circuit 223, 224 and 225 are at logic 1. Each of these outputs is applied to a latch 230 comprising an inverter 231 and a NAND circuit 232 connected in a conventional latching arrangement. The output from the NAND circuit 223 is an input to the inverter 231 while the NAND circuit 232 is additionally energized by the outputs of the NAND circuits 224 and 225. When these three inputs are at logic 1, the latch 230 causes the output of an inverter 223 to be at logic 1. This is the $\overline{N}$ signal. The NAND circuit 232, at logic 1, also sets a NAND circuit 234 to logic 0 and this is the $\overline{C}$ signal. NAND circuits 224 and 225 are also connected as inputs to a latch 235 which includes a NAND circuit 236 energized by the NAND circuit 224 and a NAND circuit 237 energized by the NAND circuit 225. With both the inputs at logic 1, a logic 1 appears at the NAND circuit 236 and a logic 0, at the NAND circuit 237. The output from the NAND circuit 237 is applied to the NAND circuit 234 while the output from the NAND circuit 236 is applied to an inverter 240, the output of which is $\overline{I}$. By energizing both inputs to the NAND circuit 234 with logic 1's, the output, which represents $\overline{C}$, is at logic 0. When the NCDP character is received, the NAND circuit 223 goes to logic 0; and the latch 230 shifts to produce a logic 1 which is coupled to the inverter 233 and a logic 0 which is coupled to the NAND circuit 234 whereby $\overline{N}$ goes to 0 and $\overline{C}$ goes to logic 1. When the INDP character is received causing the NAND circuit 224 to go to logic 0, the outputs of the latch 235 are shifted so that $\overline{I}$ shifts to logic 0 and the latch 235 shifts to produce a logic 0 input to the NAND circuit 234. $\overline{C}$ remains at logic 1. Receipt of the $\overline{\text{REND}}$ character causes the NAND circuit 225 to go to 0 so that the $\overline{N}$ remains at logic 1. The latch 235 shifts $\overline{I}$ to logic 1 and $\overline{C}$ to logic 0. Therefore, the master station SCAN CONTROL and COMMAND DECODER shown in FIG. 8 responds to the receipt of the command characters $\overline{\text{NCDP}}$, $\overline{\text{INDP}}$ and $\overline{\text{REND}}$ by generating the $\overline{\text{PT RESET}}$, $\overline{I}$, $\overline{N}$ and $\overline{C}$ outputs.

Figure 9:
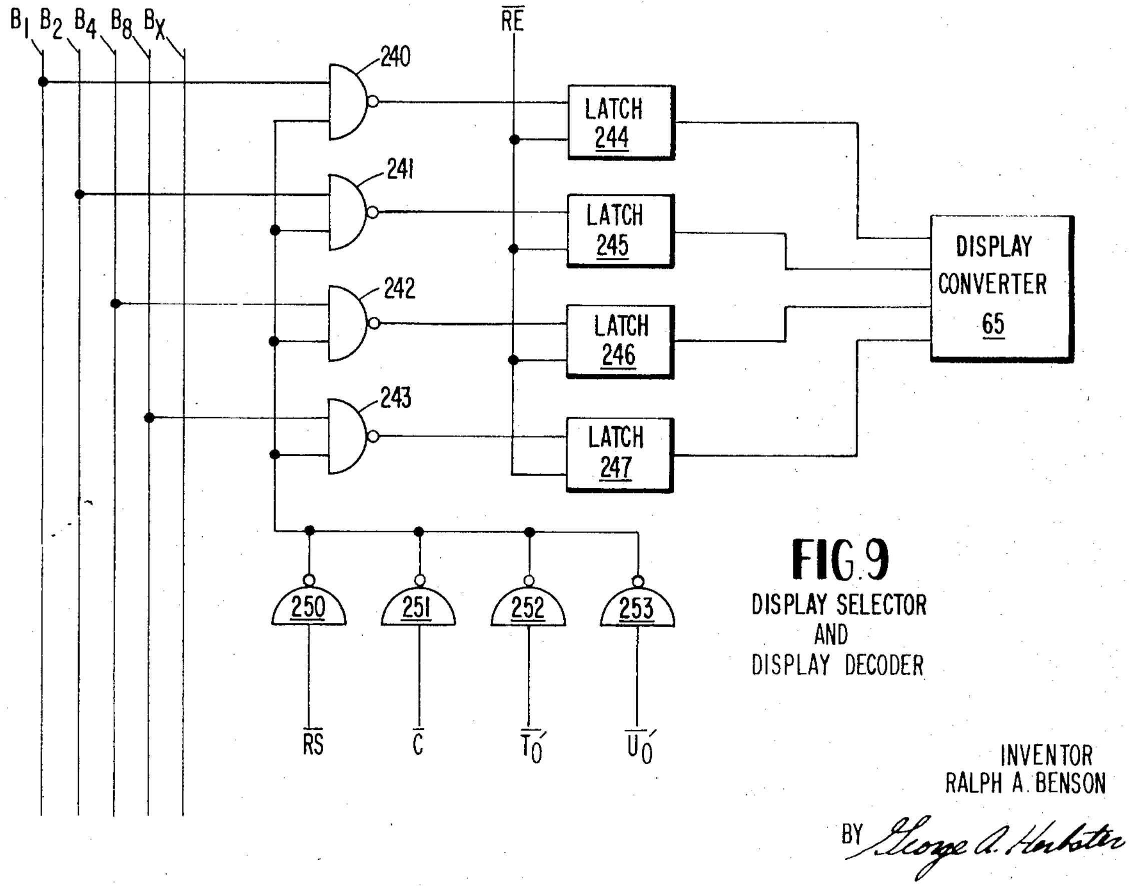
FIG. 9 is a logic schematic of a display selector and decoder adapted to be utilized in the master station of FIG. 2.

The $\overline{I}$, $\overline{N}$ and $\overline{C}$ signals are then processed by a DISPLAY SELECTOR and DISPLAY DECODER. One specific embodiment is shown in FIG. 9 and is adapted for receipt of a binary-coded-decimal digital information. Therefore, four NAND circuits 240, 241, 242 and 243 are connected to the $B_1$, $B_2$, $B_4$ and $B_8$ busses respectively. The outputs of each NAND circuit are coupled through latches 244, 245, 246 and 246 respectively to produce a continuous input to the DISPLAY CONVERTER 65. The input to the DISPLAY CONVERTER 65 continues until a reset signal $\overline{RE}$ is applied to the latches. Four inverters 250, 251, 252 and 253 are energized by the remote station address complement, $\overline{RS}$, the $\overline{C}$ signal, $\overline{T_0}'$, and $\overline{U_0}'$ from the master station POINT ADDRESS COUNTER 60. When the first data word is received by the master station, the master station ADDRESS ENCODER 26 shown in FIGS. 2 and 9 energizes the inverter 250 with the $\overline{RS}$ signal. The $\overline{C}$ signal is produced by the SCAN CONTROL shown in FIG. 8. Therefore, when all four inverters are energized simultaneously, the combined outputs will go to logic 1 and the NAND circuits 240 through 243 will be energized to permit the data on the busses $B_1$ through $B_8$ to be transferred through the latches 244 through 247 to thereby energize the DISPLAY CONVERTER 65 until the reset signal $\overline{RE}$ is applied. Similar circuits would be added to each point in the system. For different points of continuous data at the same remote station the inverters similar to the inverters 252 and 253 would be connected to different outputs from the POINT ADDRESS COUNTER 60. Non-continuous data points would include an inverter similar to the inverter 251 energized by the $\overline{N}$ signal or the $\overline{I}$ signal when indication points were involved. All points for different remote stations would be coupled to other outputs from the REMOTE STATION ADDRESS ENCODER 26 shown in FIG. 2 by inverters similar to the inverter 250.

Therefore, it will be obvious from an analysis of FIGS. 8 and 9 that immediately after the command word is sent from the master station to the remote station, the display converter for the first continuous data point at the remote station will be energized to receive the data word from the remote station. As each subsequent data word is received, the master station point address counter will cause different display converters to be energized for continuous data points. This continues until the last continuous data point is read and a last-data-in-group word is received from the remote station. Immediately upon the receipt of this command word from the remote station, the master station responds by resetting the point address counter and sequentially energizing the next series of point display devices in sequence with receipt of the following data words from the remote station. At the end of the data transmission from the remote station, the master station responds to a last data word to cause the master station display selectors to reset to energize the display means for the next remote station point equipment in sequence and to generate a command word to the next remote station to repeat the process. The entire supervisory system is continuously operative. Further, the remote station reacts to specific words from the remote station to permit it to be responsive to messages of various formats and variable lengths.

Therefore, in accordance with this invention, a digital information transfer system has been provided wherein vairable length messages are handled by encoding each message from a remote station with last data words. While the specific master station and remote stations shown in FIGS. 2 and 3 and the specific circuit embodiment shown in FIGS. 4 through 9 indicate a specific embodiment of the supervisory control system, it will be obvious that the basic means for providing the improved function whereby the system is continuously active may be applied to any digital information transfer system. Further, the specific logic diagrams are limited to that logic which is specifically related to this technique. Additional circuits and inputs may be applied to any of the circuits and different circuit embodiments may be incorporated to permit this invention to be adapted for use in digital information transfer systems which incorporate still further functions. Therefore, it is an object of the appended claims to cover all such modifications and variations which are obvious to those of ordinary skill in the art and which come within the true spirit and scope of this invention.

What is claimed as new and desired to be secured by Letters Patent of the United States is:

1. In a digital information transfer system including sequentially operated, constant length digital data word generating means; sequentially operated, digital data word utilization means having a plurality of predetermined operating modes; communications means interconnecting said generating means and said utilization means; and means at said generating means and said utilization means for synchronizing the operation thereof, the improvement of means for setting said utilization means comprising:

(a) last-data digital word transmission means coupled to said generating means and said communications means, said transmission means being operative in response to the generation of a last digital data word; and (b) condition setting means coupled to said utilization means and said communications means for setting said utilization means to another predetermined condition in response to the receipt of the last-data digital word from said generating means.

2. A digital information transfer system as recited in claim 1 additionally comprising means for resetting said generating means, said reset means being operative when the last-data digital word is transmitted.

3. A digital information transfer system as recited in claim 2 wherein said transmission means comprises a signal generator means connected to said generating means for producing a last-data signal when the last digital data word is generated and last-data digital word encoder means connected to said communications means and said signal generator means for transmitting the last-data digital word.

4. A digital information transfer system as recited in claim 3 wherein said resetting means is connected to said digital data generating means and said signal generator means to be responsive to the last-data signal.

5. A digital information system as recited in claim 3 wherein said condition setting means comprises decoding means uniquely responsive to the last-data digital word, said decoding means being connected to said communications means, and control means connected to said utilization means and said decoding means for setting said utilization means condition.

6. A system for transferring digital information from a plurality of remote stations through communications means to a controlling master station upon command therefrom, said master station including means for sequentially interrogating each remote station to cause an information transfer and utilization means responsive to the information, each of said remote stations including at least one means for generating the digital information as a constant length digital data word and sequencing means responsive to master station commands for sequentially energizing said generating means and for transmitting the digital data words to said master station and means for responding to the last digital data word from one of said remote stations to cause said master station to interrogate the next of said remote stations in sequence comprising:

(a) means at each of said remote stations for generating a last digital data word signal when the last digital data word generating means in sequence is energized;

(b) means at each of said remote stations coupled to said communications means and to said signal generating means for transmitting a last-data digital word in response to the last digital word signal;

(c) reset means at each of said remote stations coupled to said signal generating means and to said sequencing means for resetting said remote station upon generation of the last-data digital word;

(d) master station advancing means coupled to said communications means, said sequential interrogating means and said utilization means, said advancing means being responsive to receipt of the last-data digital word from a remote station to advance said master station and interrogate the next remote station in sequence.

7. A digital information transfer system as recited in claim 6 wherein a last digital data word signal generating means is connected to the last of said digital data word generating means at each remote station to be energized by said sequencing means simultaneously therewith.

8. A digital information transfer system as recited in claim 7 wherein said last digital data word signal generating means at each remote station includes a common conductor connected to said last-data digital word generating means and switching means adapted for selectively connecting said conductor to the last of said sequentially energized digital data word generating means.

9. A digital information transfer system as recited in claim 7 wherein said last-data digital word comprises an encoder connected to said communications means, said sequencing means and to said last digital data word signal generating means for simultaneous energization by a timing signal from said sequencing means and by the last digital data word signal.

10. A digital information transfer system as recited in claim 9 wherein each of said remote stations includes a programmer and a counter means controlled thereby and connected to each of said digital data word generating means for sequencing, said reset means being coupled to said last digital data word signal generating means and said programmer, said programmer resetting said counter means in response to the last digital data word signal.

11. A digital information transfer system as recited in claim 9 wherein said master station includes a programmer and counter means controlled thereby and wherein said utilization means includes a plurality of utilization devices connected to said communications means and said counter means to be sequentially energized by the digital data words and said advancing means comprises decoding means responsive to the last-data digital word and means connected to said decoding means and said programmer for causing said programmer to reset said counter means and to advance said sequential interrogating means.

12. A supervisory system including means for transferring information from a plurality of data points at a plurality of remote stations through communications means to a plurality of utilization means at a controlling master station, said information transfer means comprising:

(a) master station operation directing means for producing sequencing signals;

(b) means connected to said operation directing means for selectively generating one of a plurality of digital command words, certain of the command words being adapted to initiate information transfer from data points at each remote station in sequence, said communications means being adapted to transfer the command words to each remote station;

(c) operation directing means at each remote station;

(d) information transfer control means at each remote station connected to said operation directing means and said communications means and responsive to information transfer command words for that station to produce a plurality of control signals;

(e) digital data word generating means for each data point, data points at each remote station being classified into data groups, the plurality of control signals individually identifying each data group and said operation directing means producing a sequencing signal, each of said digital data word generating means being connected to said operation directing means, said information transfer control means and said communications means for transmitting digital data words to said master station in sequence by data group, each of said digital data word generating means being responsive to a single control signal and sequencing signal combination;

(f) means connected to said communications means, said operation directing means, said information transfer control means and the last digital data word generating means in each data group for signaling the selection of each of said last digital data word generating means, said operation directing means resetting the sequencing signal in response to the generating means signal, and said information transfer control means and said communication means transmitting to said master station a last-data digital command word in response to the generation of the last digital data word in the last data group and a last-data-in-group digital command word in response to the generation of the last digital data word for other data groups;

(g) information transfer control means at said master station connected to said communications means and said operation directing means and responsive to the last-data and last-data-in-group command words to reset the sequencing signals and produce data group identifying signals;

(h) selector means adapted to couple of utilization means to said communications means in sequence, said selector means being connected to said operation directing means to be energized by said sequencing signal and to said information transfer control means to be energized by the data group identifying signals whereby data is sequentially applied to each utilization device.

13. A supervisory system as recited in claim 12 wherein said master and remote station operation directing means each comprise a programmer means and a counter means controlled by said programmer means to produce sequencing signals and to be reset thereby, said master and remote station operation directing means being connected to said master and remote station information transfer control means and additionally including synchronizing means.

14. A supervisory system as recited in claim 13 wherein each remote station has a digital address and wherein the command word from said master station comprises a remote station address character and a command character, said command word generating means including a remote station address character encoder and a command character encoder connected to said programmer means and said communications means.

15. A supervisory system as recited in claim 14 wherein said remote station information control means includes a remote station address character decoder and a command character decoder which respond to the remote station address and command characters from said master station to enable only that remote station information control means associated with the addressed remote station to produce the control signals.

16. A supervisory system as recited in claim 15 wherein each digital data work generating means comprises gating means for coupling said generating means to said communications means, each gating means in one data group being energized by one control signal and by one sequencing signal to couple each of said digital data word generating means to said communications means in a preset sequential order, each gating means at the last digital data word generating means for each data group being connected to said information transfer control means to thereby reset said remote station counter means, change the control signal and generate a command word for transmission to said master station.

17. A supervisory system as recited in claim 16 wherein each of the utilization means includes a means for converting the digital data words from each digital data word generating means at each remote station, said selector means including gating means adapted to individually connect each of said converter means to said communications means in the same order as the individual digital data word generating means transmit, said gating means being responsive to a remote station address signal from said remote station address encoder, a data group identifying signal and a sequencing signal.

18. A supervisory ssytem as recited in claim 15 wherein said command encoder is adapted to generate a plurality of command characters for controlling the transfer of information from the data groups and includes means for selecting a transfer format to control the specific command character which is generated, each of said remote station information transfer control means being responsive to said plurality of command signals to vary the format in which the information transfer occurs, said remote station information transfer control means generating a last-data-in-group command word which identifies the next succeeding data group whereby data groups may be omitted from a given information transfer.

19. A supervisory system as recited in claim 18 wherein each of said remote station information transfer control means comprises command character decoder means for generating a command signal which depends upon the command character received from said master station, variable sequencing means connected to said decoder means and responsive to said last-data-in-group signals for generating a signal indicating the next data group and means responsive to the next data group signal for generating the last-data-in-group command which includes a character identifying the next data group, whereby said variable sequencing means responds to said command character to control which data groups transfer information to said master station and said master station information transfer control means respond to the command character in each last-data-in-group command word to select the proper utilization devices for receiving the information.

20. A supervisory system as recited in claim 19 wherein the last-data-in-group words and the last-data word from each remote station comprises a complemented remote station address character and a command character, each command character being produced by a command encoder capable of producing a plurality of command characters in response to the last-data signals and to the programmer means, one of the command characters being generated when the last data generating means transmits a digital data word, said master station informtion control means respsonding to the last-data character by resetting said master station counter means and causing said programmer means to generate another command word having the next sequential remote station address character.

21. A supervisory system as recited in claim 20 wherein one of the data groups is to transfer information to said master station if a predetermined condition exists, said system additionally comprising means to sense the presence of the predetermined condition and generate a condition signal, said variable sequencing means being responsive to the presence of the condition to cause all data information to be transferred to said master station and to the absence of the condition to cause information in the next succeeding data group to be transmitted.

22. A supervisory system as recited in claim 21 wherein said master station command decoder means initially produces one data group identifying control signal, said decoder including means responsive to last-data-in-group and last-data words for changing the control signal to thereby energize other selector means.

References Cited

UNITED STATES PATENTS

| | | | |
|---|---|---|---|
| 3,397,386 | 8/1968 | Bishup et al. | 340—163 |
| 3,408,626 | 10/1968 | Gabrielson | 340—163 |

DONALD J. YUSKO, Primary Examiner